(12) United States Patent
Miyashita et al.

(10) Patent No.: US 8,721,201 B2
(45) Date of Patent: May 13, 2014

(54) PRINTING APPARATUS AND TANGIBLE COMPUTER-EXECUTABLE MEDIUM

(75) Inventors: Tomoki Miyashita, Nagoya (JP); Hidekazu Ishii, Aisai (JP); Akihiko Niwa, Toki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1229 days.

(21) Appl. No.: 12/072,626

(22) Filed: Feb. 27, 2008

(65) Prior Publication Data
US 2008/0205959 A1 Aug. 28, 2008

(30) Foreign Application Priority Data
Feb. 27, 2007 (JP) ................................. 2007-047131

(51) Int. Cl.
*B41J 11/44* (2006.01)

(52) U.S. Cl.
USPC ............................................. 400/76; 358/1.2

(58) Field of Classification Search
USPC .............. 400/76, 615.2; 346/24; 358/304, 1.2
See application file for complete search history.

(56) References Cited

U.S. PATENT DOCUMENTS

| | | | | |
|---|---|---|---|---|
| 4,827,358 A * | 5/1989 | Matsumoto | ................... | 358/296 |
| 4,958,111 A * | 9/1990 | Gago | ................................. | 318/6 |
| 5,314,256 A | 5/1994 | Niwa | | |
| 5,551,785 A * | 9/1996 | Mori et al. | ...................... | 400/76 |
| 5,951,174 A * | 9/1999 | Handa | ...................... | 400/120.01 |
| 6,269,341 B1 * | 7/2001 | Redcay, Jr. | ........................ | 705/8 |
| 7,103,154 B1 * | 9/2006 | Cannon et al. | ............... | 379/67.1 |
| 2004/0028441 A1* | 2/2004 | Motoyanagi | .................... | 400/76 |
| 2007/0013939 A1* | 1/2007 | Yoshikawa | ................... | 358/1.14 |
| 2007/0198910 A1* | 8/2007 | Jensen et al. | .................. | 715/505 |

FOREIGN PATENT DOCUMENTS

| | | |
|---|---|---|
| JP | 5084975 | 4/1993 |
| JP | 6-031987 | 2/1994 |
| JP | 7266627 | 10/1995 |
| JP | 7276715 | 10/1995 |
| JP | 2004-096687 | 3/2004 |
| JP | 2004-130675 | 4/2004 |
| JP | 2005138556 | 6/2005 |

OTHER PUBLICATIONS

JPO, Machine Translation of JP2004-096687.*
XP002663747; Peter Kent, Brent D. Helop: "Word 2003 Bible", Wiley Publishing Inc., 2003 Indeanapolis, IN; ISBN: 0-7645-3971; pp. 44-45.

* cited by examiner

*Primary Examiner* — David Banh
(74) *Attorney, Agent, or Firm* — McCarter & English, LLP

(57) ABSTRACT

A CPU generates time stamp data using a timed result for the present time timed by timer and a set expression pattern. Then, the CPU generates modified time stamp data for a predetermined time period based on the time stamp data. The CPU identifies the maximum time stamp data through the printing range of the above time stamp data. The CPU reduces the font size until the maximum time stamp data becomes printable onto the printing medium. The CPU then sets the reduced font size as the font size for each time stamp data, etc., and carries out printing.

9 Claims, 11 Drawing Sheets

FIG. 3

2007. February. 04. Sun

| YEAR | MONTH | DAY | DAY-OF-WEEK | TIME |
|---|---|---|---|---|
| YEAR EXPRESSION PATTERN (1) | MONTH EXPRESSION PATTERN (3) | DAY EXPRESSION PATTERN (1) | DAY-OF-WEEK EXPRESSION PATTERN (4) | TIME EXPRESSION PATTERN (NONE) |

FIG. 4

| | EXPRESSION CONTENT | CHARACTER NUMBER VARIATION |
|---|---|---|
| | EXPRESSION EXAMPLE | |
| YEAR EXPRESSION PATTERN (1) | DOMINICAL YEAR DISPLAY (4-DIGIT) | NO |
| | 2007 | |
| YEAR EXPRESSION PATTERN (2) | DOMINICAL YEAR DISPLAY (SHORTENED) | NO |
| | 06 | |

FIG. 5

| | EXPRESSION CONTENT | CHARACTER NUMBER VARIATION |
|---|---|---|
| | EXPRESSION EXAMPLE | |
| MONTH EXPRESSION PATTERN (1) | NUMERICAL EXPRESSION (2-DIGIT) | NO |
| | 05,12 | |
| MONTH EXPRESSION PATTERN (2) | NUMERICAL EXPRESSION (1 OR 2-DIGIT) | YES |
| | 5,12 | |
| MONTH EXPRESSION PATTERN (3) | ENGLISH WORD EXPRESSION (WHOLE WORD) | YES |
| | May,December | |
| MONTH EXPRESSION PATTERN (4) | ENGLISH WORD EXPRESSION (SHORTENED) | NO |
| | May,Dec | |

FIG. 6

| | EXPRESSION CONTENT | CHARACTER NUMBER VARIATION |
|---|---|---|
| | EXPRESSION EXAMPLE | |
| DAY EXPRESSION PATTERN (1) | NUMERICAL EXPRESSION (2-DIGIT) | NO |
| | 02,20 | |
| DAY EXPRESSION PATTERN (2) | NUMERICAL EXPRESSION (1 OR 2-DIGIT) | YES |
| | 2,20 | |

FIG. 7

| | EXPRESSION CONTENT | CHARACTER NUMBER VARIATION |
|---|---|---|
| | EXPRESSION EXAMPLE | |
| DAY-OF-WEEK EXPRESSION PATTERN (1) | JAPANESE KANJI CHARACTER EXPRESSION | NO |
| | 土 | |
| DAY-OF-WEEK EXPRESSION PATTERN (2) | ENGLISH WORD EXPRESSION (WHOLE WORD) | YES |
| | Saturday | |
| DAY-OF-WEEK EXPRESSION PATTERN (3) | ENGLISH WORD EXPRESSION (SHORTENED) | NO |
| | Sat | |

FIG. 8

| | EXPRESSION CONTENT | CHARACTER NUMBER VARIATION |
|---|---|---|
| | EXPRESSION EXAMPLE | |
| TIME EXPRESSION PATTERN (1) | 12 HOURS UNIT EXPRESSION (ALWAYS 2-DIGIT) | NO |
| | 08:45 AM,10:24 PM | |
| TIME EXPRESSION PATTERN (2) | 12 HOURS UNIT EXPRESSION (1 OR 2-DIGIT) | YES |
| | 8:45 AM,10:24 PM | |
| TIME EXPRESSION PATTERN (3) | 24 HOURS UNIT EXPRESSION (2-DIGIT) | NO |
| | 08:45,22:24 | |
| TIME EXPRESSION PATTERN (4) | 24 HOURS UNIT EXPRESSION (1 OR 2-DIGIT) | YES |
| | 8:45,22:24 | |

FIG. 11

| |
|---|
| 2007. February. 04. Sun |
| 2007. February. 05. Mon |
| 2007. February. 06. Tue |
| ⋮ |
| 2007. March. 04. Sun |
| ⋮ |
| 2007. April. 04. Wed |
| ⋮ |
| 2007. May. 04. Fri |
| ⋮ |
| 2007. September. 04. Tue |
| ⋮ |
| 2007. October. 04. Thu |
| ⋮ |
| 2007. November. 04. Sun |
| ⋮ |
| 2007. December. 04. Tue |
| ⋮ |
| 2008. January. 04. Fri |

FIG. 13
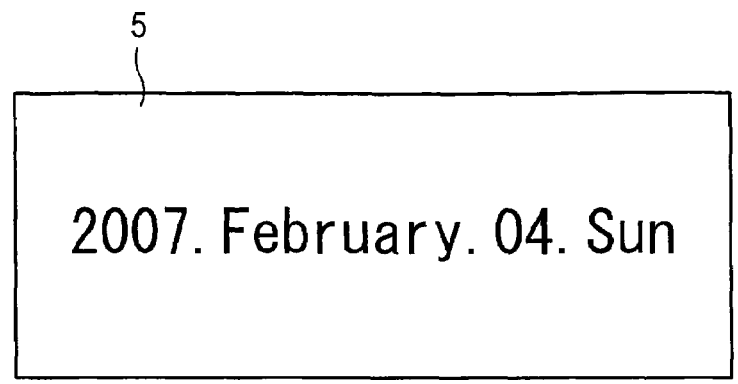
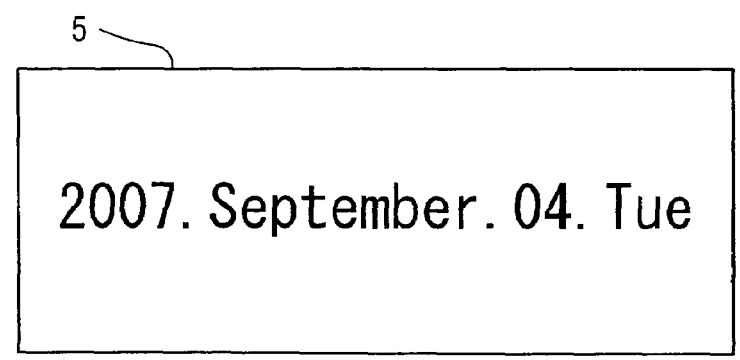
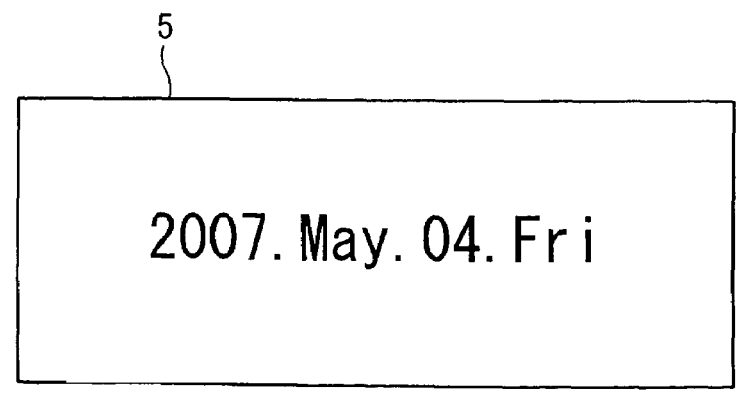

PRINTING APPARATUS AND TANGIBLE COMPUTER-EXECUTABLE MEDIUM

CROSS-REFERENCE TO RELATED APPLICATION

This Application claims priority from JP 2007-047131, filed Feb. 27, 2007, the content of which is hereby incorporated by reference in its entirety.

TECHNICAL FIELD

The disclosure relates to a printing apparatus and a tangible computer-executable medium featuring, with respect to given print data, a print data modification function according to which the above print data is modified based on conditions set for the above data, and a size automatic adjustment function according to which a print range of the print data is automatically adjusted to enable printing onto a printing medium. More particularly, the disclosure relates to a printing apparatus and a tangible computer-executable medium capable of applying a print data modification function and a size automatic adjustment function with respect to date print data indicating date and time.

BACKGROUND

Printing apparatuses having a print data modification function and a size automatic adjustment function have been conventionally known.

Here, the print data modification function serves to automatically modify a part of given print data based on predetermined set conditions. Here, a sequential number function is given as a representative example for the above print data modification function. In the case of sequential number function, predetermined print data (for instance, "the ○○th") is modified based on a predetermined set condition (for instance, 5 to 20). Accordingly, in the case of the above example, the above print data is modified as in the 5$^{th}$, the 6$^{th}$ . . . the 20$^{th}$.

Further, the size automatic adjustment function serves to automatically adjust the size of the printing range for the print data so as to enable printing thereof with respect to a printing area of a recording medium.

Such a printing apparatus having both the print data modification function and the size automatic adjustment function is disclosed in Japanese Patent Application Publication No. 2005-138556. In this printing apparatus disclosed in the Japanese Patent Application Publication No. 2005-138556, modification of the above print data and automatic adjustment of its size are carried out if the font of the characters constituting the print data is proportional and a sequential number function and a size automatic adjustment function are set.

As a result, according to the printing apparatus disclosed in the Japanese Patent Application Publication No. 2005-138556, print data with a set proportional font is modified as needed using the sequential number function. Then, the above print data is printed onto the printing medium with a suitable size set through the size automatic adjustment function.

Here, the above-described print data modification function includes a function according to which date print data indicating the date and time (for instance, "2006年 12 月 30 日") is modified and then printed. According to this function, date print data is modified as needed as in "2006年 12 月 31 日", "2007 年 1月 1 日", for instance, and is then printed onto the printing medium.

As is understood from the above example, when the date print data is modified in accordance with the print data modification function, there may be cases that the number of characters constituting the above date print data changes.

In this case, simply applying the size automatic adjustment function with respect to the date print data may result in changes in the printing range (i.e. the size of the characters constituting the above date print data) of the above date print data based on the change in the number of characters.

For instance, the characters in "2006 年 12 月 31 日" and "2007 年 1月 1 日" which are generated in accordance with the print data modification function can be set differently in character size. As a result, when the above date print data is printed onto the printing medium, the printed products appear to be different from each other. As a result, it is impossible to satisfy the demands of the users that desire a printed product with a good appearance.

From this point of view, the date print data is expressed in various fashions. Although the date print data may be expressed using numbers and Japanese kanji as was shown in the above example, it may also be expressed by using numbers and symbols as in "2006.12/31], or by using a foreign language such as English, etc. and numbers as in "2006.December.31".

With respect to the case that the date print data is expressed using a foreign language (for instance, English), upon a close consideration of the expression of "month" alone, it is understood that there are months that are expressed in three characters as in "May", but there are also months that are expressed in nine characters as in "September". Accordingly, when the print data modification function is used with respect to date print data including the English term for the respective "month", the number of characters may greatly differ. Thus, the character size which is set for the above date print data is set in accordance with the size automatic adjustment function to a size which differs greatly depending on the respective date print data. As a result, a sequence of date print data based on the print data modification function is provided as a printed product whose appearance differs greatly depending on the respective date print data. In other words, if the print data modification function and the size automatic adjustment function are applied with respect to the above-described date print data, it is impossible to obtain a printed product having good appearance, thereby making the above described problem even worse.

SUMMARY

The disclosure has been worked out to overcome the above-described problems in the background art and relates to a printing apparatus and a tangible computer-executable medium having a print data modification function and a size automatic adjustment function, and more particularly, relates to a printing apparatus and a tangible computer-executable medium capable of providing a printed product having a good appearance even in the event a print data modification function and a size automatic adjustment function are applied with respect to date print data indicating the date and time.

To achieve the purpose of the disclosure, there is provided a printing apparatus comprising: a timing device that times passage of time; a date print data generating device that generates date print data based on a timed result of the timing device; a printing device that prints the date print data generated by the date print data generating device in a predetermined printing area set as standard with respect to a printing medium; a memory device that stores a plurality of time expression patterns that indicate time in a predetermined expression form and change with passage of time; an expression pattern setting device that sets one time expression pattern from amongst the plurality of time expression patterns stored in the memory device, with respect to the date print data; and a size automatic setting device that sets a size of characters composing the date print data to a character size at which the date print data is fittable within the printing area, wherein the size automatic setting device comprises: a modified date print data generating device that generates a plurality of modified date print data corresponding to passage of time within a predetermined period of time, based on the time expression pattern set in the expression pattern setting device; a maximum printing range identifying device that calculates respective printing ranges based on character size data for each character composing the date print data and the plurality of modified date print data and identifies maximum date print data with a maximum printing range from the date print data or the modified date print data; and a size setting device that reduces character size of the maximum date print data until the printing range of the maximum date print data is fittable within the printing area and sets size data indicating the character size as size data of characters composing the date print data and the modified date print data.

In other words, according to the above printing apparatus, date print data generated based on the timed result of a timing device is printed with respect to a printing area of the printing medium. Here, a date expression pattern is set for the above date print data. Accordingly, the above printing apparatus generates a plurality of modified date print data based on the set date expression pattern and the above date print data.

Then, the above printing apparatus calculates the respective printing ranges corresponding to the date print data and the modified date print data and identifies the maximum date print data with the largest printing range. The above printing apparatus then reduces the character size of the above maximum date print data using the size automatic setting device, until the printing range of the identified maximum date print data can be fitted within the above-mentioned printing area. The above printing apparatus then sets the character size at which the printing range of the maximum date print data becomes fittable in the printing area as the character size of the date print data and the modified date print data by using the size setting device.

According to the above printing apparatus, the character sizes of the date print data and the modified date print data are set to a uniform size at which the maximum date print data can be fitted within the printing area. In other words, upon printing the date print data and the modified date print data, the characters composing these data are printed without protruding out from the printing area and their sizes are made uniform. In other words, according to the above printing apparatus, in a sequence of printed products containing printed date print data and modified date print data, it is possible to prevent inconsistency in character size and protrusion and the like of the characters from the printing area, thereby providing an attractive printed product that has unity.

According to another aspect of the disclosure, there is provided a printing apparatus comprising: a timing device that times passage of time; a memory device that stores a plurality of time expression patterns that indicate time in a predetermined expression form and change with passage of time; a controller that executes: a date print data generating step that generates date print data based on a timed result of the timing device; an expression pattern setting step that sets one time expression pattern from amongst the plurality of time expression patterns stored in the memory device, with respect to the date print data; and a size automatic setting step that sets a size of characters composing the date print data to a character size at which the date print data is fittable within a predetermined printing area set as standard with respect to a printing medium; and a printing device that prints the date print data generated at the date print data generating step in the predetermined printing area of the printing medium, wherein, when executing the size automatic setting step, the controller executes: a modified date print data generating step that generates a plurality of modified date print data corresponding to passage of time within a predetermined period of time, based on the time expression pattern set at the expression pattern setting step; a maximum printing range identifying step that calculates respective printing ranges based on character size data for each character composing the date print data and the plurality of modified date print data and identifies maximum date print data with a maximum printing range from the date print data or the modified date print data; and a size setting step that reduces character size of the maximum date print data until the printing range of the maximum date print data is fittable within the printing area and sets size data indicating the character size as size data of characters composing the date print data and the modified date print data.

In other words, according to the above printing apparatus, date print data generated based on the timed result of a timing device is printed with respect to a printing area of the printing medium. Here, a date expression pattern is set for the above date print data. Accordingly, the above printing apparatus generates a plurality of modified date print data based on the set date expression pattern and the above date print data.

Then, the above printing apparatus calculates the respective printing ranges corresponding to the date print data and the modified date print data and identifies the maximum date print data with the largest printing range. The above printing apparatus then reduces the character size of the above maximum date print data using the controller, until the printing range of the identified maximum date print data can be fitted within the above-mentioned printing area. The above printing apparatus then sets the character size at which the printing range of the maximum date print data becomes fittable in the printing area as the character size of the date print data and the modified date print data by using the controller.

According to the above printing apparatus, the character sizes of the date print data and the modified date print data are set to a uniform size at which the maximum date print data can be fitted within the printing area. In other words, upon printing the date print data and the modified date print data, the characters composing these data are printed without protruding out from the printing area and their sizes are made uniform. In other words, according to the above printing apparatus, in a sequence of printed products containing printed date print data and modified date print data, it is possible to prevent inconsistency in character size and protrusion and the like of the characters from the printing area, thereby providing an attractive printed product that has unity.

According to yet another aspect of the disclosure, there is provided a tangible computer-executable medium having instructions stored thereon that, when executed by a processor, perform a method comprising the steps of: a date print data generating step that generates date print data based on a timed result of a timing device that times passage of time; an expression pattern setting step that sets one time expression pattern from amongst a plurality of time expression patterns that are stored in a memory device, indicate time in a predetermined expression form and change with passage of time, with respect to the date print data; and a size automatic setting step that sets a size of characters composing the date print data to a character size at which the date print data is fittable within a printing area which is set as standard with respect to a printing medium and on which the date print data is printed by a printing device, wherein the size automatic setting step executes: a modified date print data generating step that generates a plurality of modified date print data corresponding to passage of time within a predetermined period of time, based on the time expression pattern set at the expression pattern setting step; a maximum printing range identifying step that calculates respective printing ranges based on character size data for each character composing the date print data and the plurality of modified date print data and identifies maximum date print data with a maximum printing range from the date print data or the modified date print data; and a size setting step that reduces character size of the maximum date print data until the printing range of the maximum date print data is fittable within the printing area and sets size data indicating the character size as size data of characters composing the date print data and the modified date print data.

In other words, according to the above tangible computer-executable medium, date print data is generated based on the timed result of a timing device. Here, a date expression pattern is set for the above date print data. Accordingly, the above tangible computer-executable medium generates a plurality of modified date print data based on the set date expression pattern and the above date print data.

Then, the above tangible computer-executable medium calculates the respective printing ranges corresponding to the date print data and the modified date print data and identifies the maximum date print data with the largest printing range. The above tangible computer-executable medium then reduces the character size of the above maximum date print data, until the printing range of the identified maximum date print data can be fitted within the above-mentioned printing area. The above tangible computer-executable medium then sets the character size at which the printing range of the maximum date print data becomes fittable in the printing area as the character size of the date print data and the modified date print data.

According to the above tangible computer-executable medium, the character sizes of the date print data and the modified date print data are set to a uniform size at which the maximum date print data can be fitted within the printing area. In other words, upon printing the date print data and the modified date print data, the characters composing these data are printed without protruding out from the printing area and their sizes are made uniform. In other words, according to the above tangible computer-executable medium, in a sequence of printed products containing printed date print data and modified date print data, it is possible to prevent inconsistency in character size and protrusion and the like of the characters from the printing area, thereby providing an attractive printed product that has unity.

BRIEF DESCRIPTION OF THE DRAWINGS

FIG. 3 is an explanatory diagram showing a general configuration of time stamp data according to a first embodiment;

FIG. 4 is an explanatory diagram of year expression pattern data according to the first embodiment;

FIG. 5 is an explanatory diagram of month expression pattern data according to the first embodiment;

FIG. 6 is an explanatory diagram of day expression pattern data according to the first embodiment;

FIG. 7 is an explanatory diagram of day-of-the-week expression pattern data according to the first embodiment;

FIG. 8 is an explanatory diagram of time expression pattern data according to the first embodiment;

FIG. 11 is an explanatory diagram of modified time stamp data generated in a modified data generation process;

FIG. 13 is an explanatory diagram showing a printed example of time stamp data using the printing apparatus according to the disclosure.

DETAILED DESCRIPTION

A detailed description of an exemplary embodiment of a printing apparatus according to the disclosure will now be given while referring to the accompanying drawings.

First Embodiment

First, the configuration of a printing apparatus 1 according to a first embodiment will be described while referring to FIG. 1.

Figure 1:
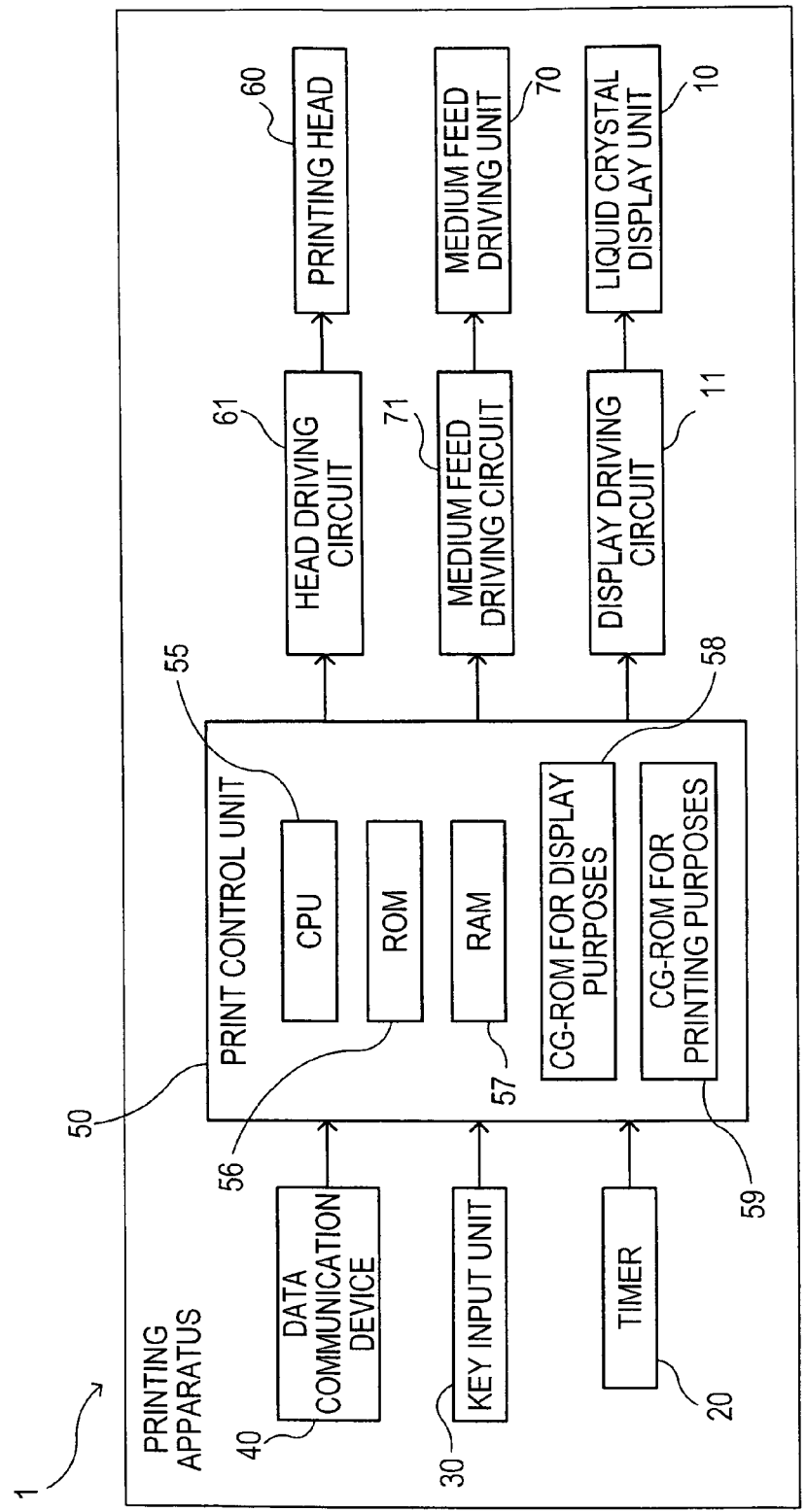
FIG. 1 is an explanatory diagram showing a configuration of a printing apparatus according to the disclosure.

As shown in FIG. 1, the printing apparatus 1 according to the first embodiment serves to carry out printing using a printing head 6 with respect to a printing medium 5 (refer to FIG. 13) fed by a medium feed driving unit 70.

The above printing apparatus 1 is mainly controlled by a print control unit 50. This print control unit 50 has a CPU 55, a ROM 56, a RAM 57, a CG-ROM 58 used for display purposes, and a CG-ROM 59 used for printing purposes.

The CPU 55 serves as a control center in the above printing apparatus 1. The CPU 55 also serves as an arithmetic processing unit for carrying out arithmetic operations based on different types of control programs stored in the ROM 56.

Figure 2:
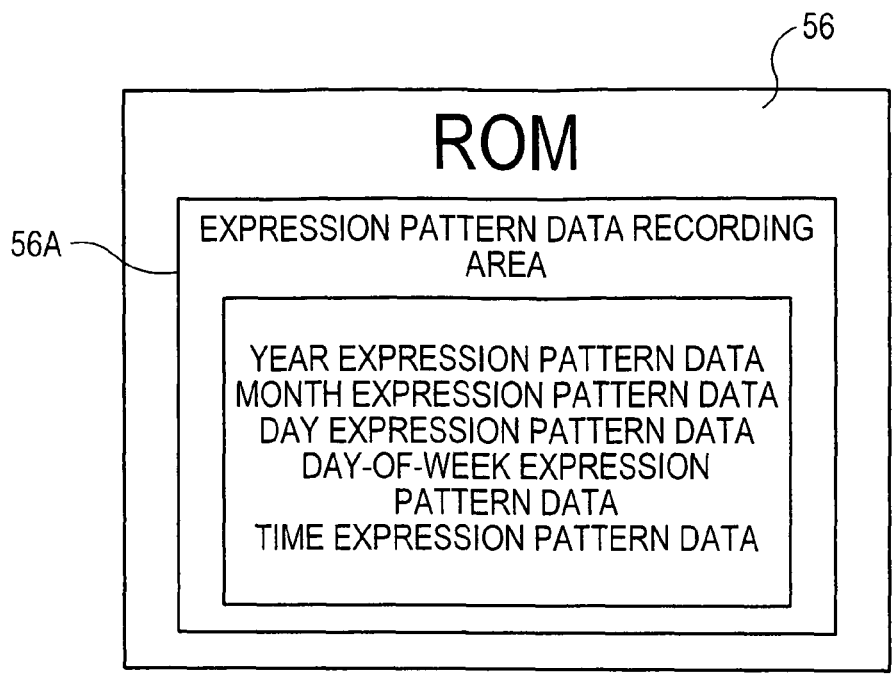
FIG. 2 is an explanatory diagram showing a ROM of a printing apparatus according to the disclosure.

The ROM 56 serves as a memory device for storing different types of control programs and data tables and the like required to control the printing apparatus 1. Specifically, the ROM 56 stores a main control program (refer to FIG. 9) and a character size decision-making program (refer to FIG. 10) to be described later. This ROM 56 also has an expression pattern data memory area 56A formed therein (refer to FIG. 2). This expression pattern data memory area 56A stores different types of expression pattern data such as year expression pattern data, month expression pattern data and the like. The different types of expression pattern data will be described later in detail while referring to the accompanying drawings.

The RAM 57 serves as a memory device for temporarily storing the computed results of the different types of control programs executed by the CPU 55. The RAM 57 also has a buffer function for printing purposes. Specifically, The RAM 57 temporarily stores print data to be printed onto the printing medium 5 (refer to FIG. 13).

The CG-ROM 59 for printing purposes serves as a memory device for storing font data for printing print data onto the printing medium 5. This CG-ROM 59 for printing purposes stores various types of font data for different typefaces and sizes. In the CG-ROM 59 for printing purposes, character codes are associated in units of characters. Accordingly, designating one character code makes it is possible to output font data to which this character data corresponds.

The CG-ROM 58 for display purposes serves as a memory device for storing CG (character graphics) for displaying the print data onto a liquid crystal display unit 10 to be described later. This CG-ROM 58 for display purposes stores the same types of data as the CG-ROM 59 for printing purposes to be described later, with the difference that this data is used for display onto a display device.

The font data stored in the CG-ROM 58 for display purposes and the CG-ROM 59 for printing purposes may include outline font data, and may also include bitmap font data. The font data may further include fixed-width font data or proportional font data.

In the printing apparatus 1, peripheral devices such as a liquid crystal display unit 10, a timer 20, a key input unit 30, a data communication device 40, a printing head 60 and a medium feed driving unit 70 and the like are connected with respect to the print control unit 50. Accordingly, the different types of peripheral devices such as the print head 60 and the medium feed driving unit 70 and the like can be controlled by the print control unit 50.

The liquid crystal display unit 10 serves as a display unit arranged in the printing apparatus 1. The liquid crystal display unit 10 displays time stamp data (e.g. date print data) which serves as print data indicating the date and time. The liquid crystal display unit 10 is connected to the print control unit 50 through a display driving circuit 11.

The display driving circuit 11 serves to control a display state of the liquid crystal display unit 10 based on a control signal from the print control unit 50.

Specifically, display in the liquid crystal display unit 10 is controlled through the display driving circuit 11 by a control signal from the print control unit 50. Display in the liquid crystal display unit 10 is carried out based on the font data stored in the CG-ROM 58 for display purposes.

The Timer 20 serves to time the present time. More specifically, the timer 20 can time the year, month, day, hour, minute and second at the present moment. The above timer also identifies the day of the week relative to the present time. The timed results of this timer 20 are acquired by the print control unit 50 and are used at the time of generating time stamp data. This will be described later.

The key input unit 30 serves as an operating unit and is arranged in the printing apparatus 1. The key input unit 30 carries out different types of operations inputted by the user. The key input unit 30 is connected to the print control unit 50. Accordingly, upon receiving an operation signal based on the operation of the key input unit 30, the print control unit 50 executes control based on the operation of the key input unit 30. For instance, when an operation of setting expression pattern data with respect to the time stamp data is carried out through the key input unit 30, the print control unit 50 sets an expression pattern with respect to the time stamp data. It is also possible to carry out an operation to input common print data other than time stamp data through the key input unit 30.

The data communication device 40 serves as a communication device and carries out data reception and transmission between the printing apparatus 1 and exterior devices (not shown). The data communication device 40 is connected to the print control unit 50. Accordingly, the print control unit 50 can acquire data such as print data which is generated by an exterior device and then print it.

The printing head 60 constitutes a printing device for printing the print data (including time stamp data) with respect to a printing medium 5. This printing head 60 is connected to the print control unit 50 through the head driving circuit 61. The head driving circuit 61 serves to control a driving state of the printing head 60 based on a control signal from the print control unit 50.

Accordingly, the print control unit 50 can control the driving state of the printing head 60 through the head driving circuit 61, thereby allowing printing onto the printing medium 5 based on the print data.

This printing head 60 may include any type of printing head. Specifically, various types of printing heads such as thermal heads or the like can be employed.

The medium feed driving unit 70 serves as a driving mechanical unit for feeding the printing medium 5 (refer to FIG. 13). More specifically, the medium feed driving unit 70 feeds the printing medium 5 from a predetermined position (for instance, a housing unit accommodating the printing medium 5) to the printing head 60. The medium feed driving unit 70 also feeds the printing medium 5 which was printed by the printing head 60 to the user. Then, during the printing operation by the printing head 60, the medium feed driving unit 70 is driven and controlled to thus achieve a desired printing. The medium feed driving unit 70 is connected to the print control unit 50 through the medium feed driving circuit 71.

The medium feed driving circuit 71 serves to carry out driving and control of the medium feed driving unit 70 based on a control signal from the print control unit 50. Accordingly, the print control unit 50 drives and controls the medium feed driving unit 70 through the medium feed driving circuit 71. As a result, the printing apparatus 1 achieves printing based on the print data with respect to the printing medium 5.

The medium feed driving unit 70 has a conventionally known configuration, and therefore, a detailed description thereof is hereby omitted.

Next, the expression pattern data recording area 56A in the ROM 56 will be described while referring to the drawings.

Expression pattern data is data having a standard expression pattern and is used for generating time stamp data. Accordingly, the printing apparatus 1 according to the first embodiment generates time stamp data based on the respective expression pattern data set with respect to the time stamp data and the timed results of the timer 20.

Here, the expression pattern data according to the first embodiment can be classified in five groups. Specifically, the expression pattern data memory area 56A stores year expression pattern data, month expression pattern data, day expression pattern data, day-of-the-week expression pattern data and time expression pattern data (refer to FIG. 2). A plurality of expression patterns are set as standard with respect to each different type of expression pattern data (refer to FIG. 4 to FIG. 8).

In the first embodiment, "year expression pattern (1)" and "year expression pattern (2)" are stored as year expression pattern data in the expression pattern data memory area 56A (refer to FIG. 4). "Year expression pattern (1)" is an expression pattern for expressing the "year" in four digits based on dominical year. Accordingly, in the case of "year expression pattern (1)", the "year" is expressed in four characters as in "2007". On the other hand, "year expression pattern (2)" is an expression pattern for expressing the "year" in two digits, based on the dominical year. In this case, year 2007 is expressed in two digits as in "07".

Since the year expressed using the "year expression pattern (1)" and the "year expression pattern (2)" is always expressed in four digits or two digits, the number of characters does not change with the passage of time.

On the other hand, the expression pattern data memory area 56A stores four types of expression patterns including "month expression pattern (1)", "month expression pattern (2)", "month expression pattern (3)" and "month expression pattern (4)" as month expression pattern data (refer to FIG. 5).

The "month expression pattern (1)" is an expression pattern according to which "month" is also expressed in a two-digit number. Specifically, the months from October to December, as well as the months from January to September are expressed in two digits. For instance, the numeric expression for the month of "July" is expressed as in "06", as shown in FIG. 5.

Then, the "month expression pattern (2)" is an expression pattern for expressing the "month" in numbers, similar with the above-described "month expression pattern (1)". However, the "month expression pattern (2)" differs from the "month expression pattern (1)" in that the "month" is expressed in a one-digit number or a two-digit number. Specifically, the months from January to September are expressed by a corresponding one-digit number, while the months from October to December are expressed by a corresponding two-digit number.

Also, the "month expression pattern (3)" is an expression pattern for expressing the "month" using English words. With the "month expression pattern (3)", the "month" is expressed using the entire English term expressing the respective "month". For instance, the month of May is expressed as in "May", and the month of December is expressed as in "December".

The "month expression pattern (4)" is an expression pattern for expressing the "month" using English words, similarly with the "month expression pattern (3). In this respect, the "month expression pattern (4) differs from the "month expression pattern (3)" in that the English term corresponding to the month is expressed by being "shortened to three characters". For instance, the month of December is expressed as in "Dec" in accordance with the "month expression pattern (4)".

As described in the above, in case of the "month expression pattern (2)", the number of characters for expressing the "month" fluctuates between one character and two characters in response to the passage of time. In the case of the "month expression pattern (3)" as well, the number of characters for expressing the "month" fluctuates from three characters (May) to nine characters (September) in response to the passage of time. Specifically, the "month expression pattern (2)" and the "month expression pattern (3)" have a character number variation data attached thereto indicating that the number of characters varies (refer to FIG. 5).

As shown in FIG. 6, the expression pattern data memory area 56A stores two types of day expression pattern data including "day expression pattern (1)" and "day expression pattern (2)", as "day expression pattern data" indicating the "day".

The "day expression pattern (1)" is an expression pattern for expressing the "day" by using a two-digit number at any given time. Accordingly, the numerical expressions for the "days" from the 1st through the $9^{th}$ are expressed as in "01 through 09", whereas the numerical expressions for the "days" between the $10^{th}$ through the $31^{st}$ are expressed by a two-digit number as in "10 through 31".

On the other hand, the "day expression pattern (2)" is similar to the "day expression pattern (1)" in that the "day" is expressed using numbers. However, if constant, the number of characters used in the "day expression pattern (2)" is one. Specifically, the numerical expressions for the "days" from the $10^{th}$ to the $31^{st}$ are expressed by two-digit numbers as in "10 through 31", while the numerical expression for the "days" from the $1^{st}$ through the $9^{th}$ are expressed as in "1 through 9". Accordingly, the "day expression pattern (2)" includes character number variation data attached thereto as shown in FIG. 6.

The expression pattern data memory area 56A stores "day-of-the-week expression pattern (1)", "day-of-the-week expression pattern (2)" and "day-of-the-week expression pattern (3)" as "day-of-the-week expression pattern data" indicating the "day of the week" (refer to FIG. 7).

The "day-of-the-week expression pattern (1)" is an expression pattern for expressing the "day-of-the-week" by using Japanese kanji characters. Specifically, in the case of the "day-of-the-week expression pattern (1)" each day of the week is expressed using one Japanese kanji character through which the "day of the week" can be identified.

The "day-of-the-week" expression pattern (2)" is an expression pattern for expressing the "days of the week" using English words. In the case of the "day-of-the-week expression pattern (2)", the "days of the week" are expressed by the English term corresponding to the respective day of the week. Specifically, the "days of the week" are expressed by one English term as in "Sunday through Saturday".

On the other hand, the "day-of-the-week expression pattern (3)" is an expression pattern for expressing the "days of the week" using English words, similarly with the "day-of-the-week expression pattern (2)". With the "day-of-the-week expression pattern (3)", the respective "days of the week" are expressed by one part of the English word (for instance, the first three characters of the English word showing the respective day of the week). Specifically, in the case of the "day-of-the-week expression pattern (3)", the "days of the week" are expressed as in "Sun trough Sat".

As shown in FIG. 7, of the day-of-the-week expression pattern data, only the "day-of-the-week expression pattern (2)" has character number variation data attached thereto. This is due to the fact that with the "day-of-the-week expression pattern (2)", the number of characters required to express the day of the week varies from six characters (as in Sunday, etc.) to nine characters (as in Wednesday, etc.). Also, as was described in the above text, with the "day-of-the-week expression pattern (1)", the days of the week are expressed using one Japanese kanji character, while with the "day-of-the-week expression pattern (3)", the days of the week are expressed using three alphabetical characters, which means that there is no variation in the number of characters. Accordingly, the "day-of-the-week expression pattern (1)" and the "day-of-the-week expression pattern (3)" do not have character number variation data attached thereto.

As shown in FIG. 8, the expression pattern data memory area 56A stores "time expression pattern (1)", "time expression pattern (2)", "time expression pattern (3)" and "time expression pattern (4) as "time expression pattern data".

The "time expression pattern (1)" is an expression pattern for showing the "time" in units of 12 hours divided into ante meridian (AM) and post meridian (PM). In the case of the "time expression pattern (1)", the "time" is always expressed using two numerical characters. For instance, 8:45 in the morning is expressed as "08:45 AM".

On the other hand, the "time expression pattern (2)" is an expression pattern for expressing the "time" in units of 12 hours, similarly with the "time expression pattern (1)". With the "time expression pattern (2)", there are cases that only one character is used to express the "time". Specifically, the time from 1 o'clock to 9 o'clock both ante meridian and post meridian is expressed by one numerical character.

The "time expression pattern (3)" is an expression pattern for expressing the "time" in units of 24 hours. In the case of the "time expression pattern (3)", the "time" is always expressed by a two-digit number as in "00 to 23".

The "time expression pattern (4)" is an expression pattern for expressing the "time" in units of 24 hours, similar with the "time expression pattern (3)". With the "time expression pattern (4)", the time from 1 o'clock in the morning till 9 o'clock in the morning is expressed by a one-digit numerical character. The time after 10 o'clock in the morning is expressed by a two-digit numerical character as in "10 to 23".

As shown in FIG. 8, the "time expression pattern (2)" and the "time expression pattern (4)" in which a variation of the number of characters occurs based on the passage of time have character number variation data attached thereto.

Next, the configuration of the time stamp data generated by the printing apparatus 1 according to the first embodiment will be described while referring to the drawings.

In the printing apparatus 1 according to the first embodiment, a respective expression pattern is set with respect to each item including "year", "month", "day" and "day of the week" by a user's operation of the key input unit 30. Then, the time stamp data is generated based on the expression patterns set for the above items and the timed results of the timer 20.

The time stamp data in the first embodiment, including the case described in this FIG. 3 is configured to have a fixed-width font.

In the example shown in FIG. 3, the "year expression pattern (1)" is set with respect to the item "year" and the "month expression pattern (3)" is set with respect to the item "month". Also, the "day expression pattern (1)" is set for the item "day". Further, the "day-of-the-week expression pattern" is set with respect to the item "day of the week" but the "time expression pattern" is not set with respect to the item "time".

In this case, if the timed result of the timer 20 is "2007/2/4", the print control unit 50 generates time stamp data based on the above-described set expression patterns and the above timed results.

As will be described later, since the "year expression pattern (1)" serves to express the dominical year in four digits (refer to FIG. 6), the print control unit 50 sets a character string such as "2007" to the "year" portion of the time stamp data. A character string such as "February" "04" "Sun" is set with respect to the respective portions "month" "day" "day of the week" based on the expression patterns that have been set in a similar fashion.

Since an expression pattern is not set with respect to the "time" portion of the above time stamp data, a character string showing the time is not set with respect thereto.

Specifically, in the above case, the print control unit 50 generates time stamp data consisting of a character string as in "2007. February. 04. Sun", as shown in FIG. 3. If the character string is "2007/2/5", then, similarly with the case described above, the print control unit 50 generates time stamp data consisting of a character string as in "2007. February. 05. Mon".

Next, a main control program to be executed in the printing apparatus 1 according to the first embodiment will be described in detail while referring to the drawings.

In this case, in the printing apparatus 1, the expression patterns described with reference to the above FIG. 3 are set with respect to each item for the time stamp data.

Figure 9:
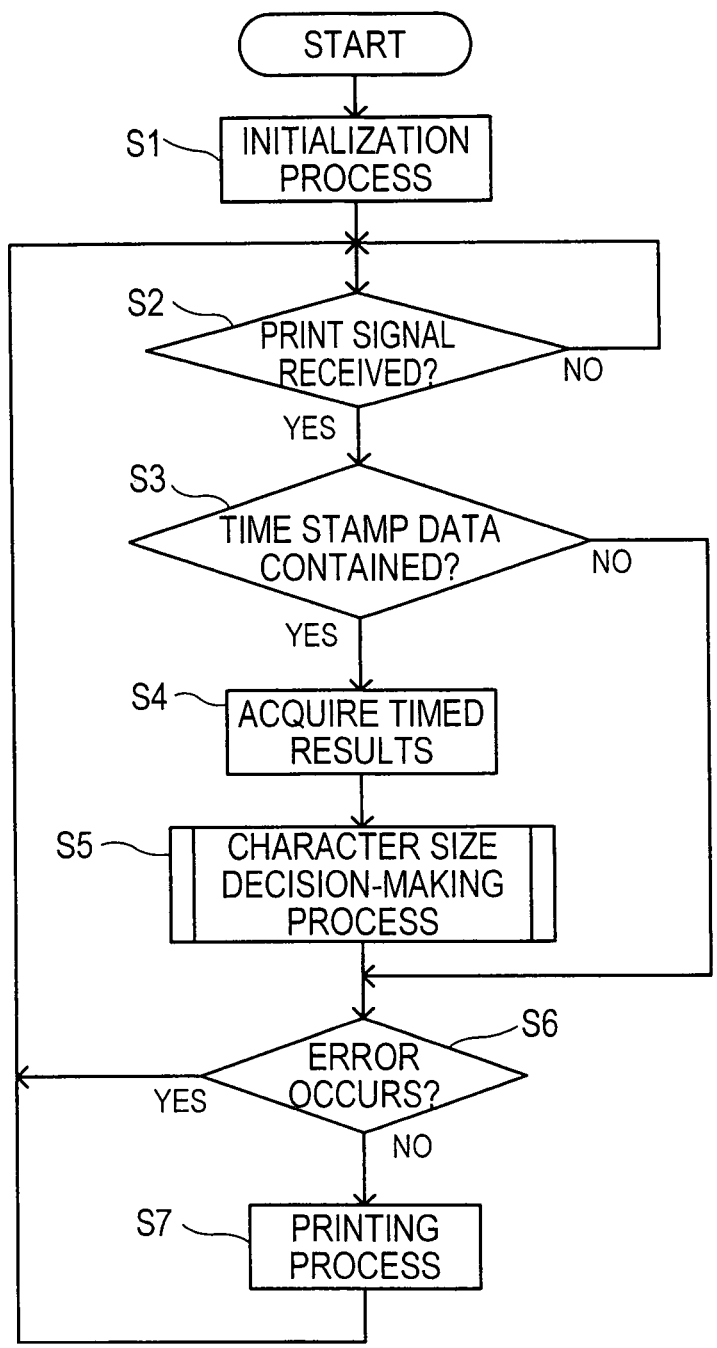
FIG. 9 is a flow chart of a main control program in the printing apparatus according to the disclosure.
Figure 10:
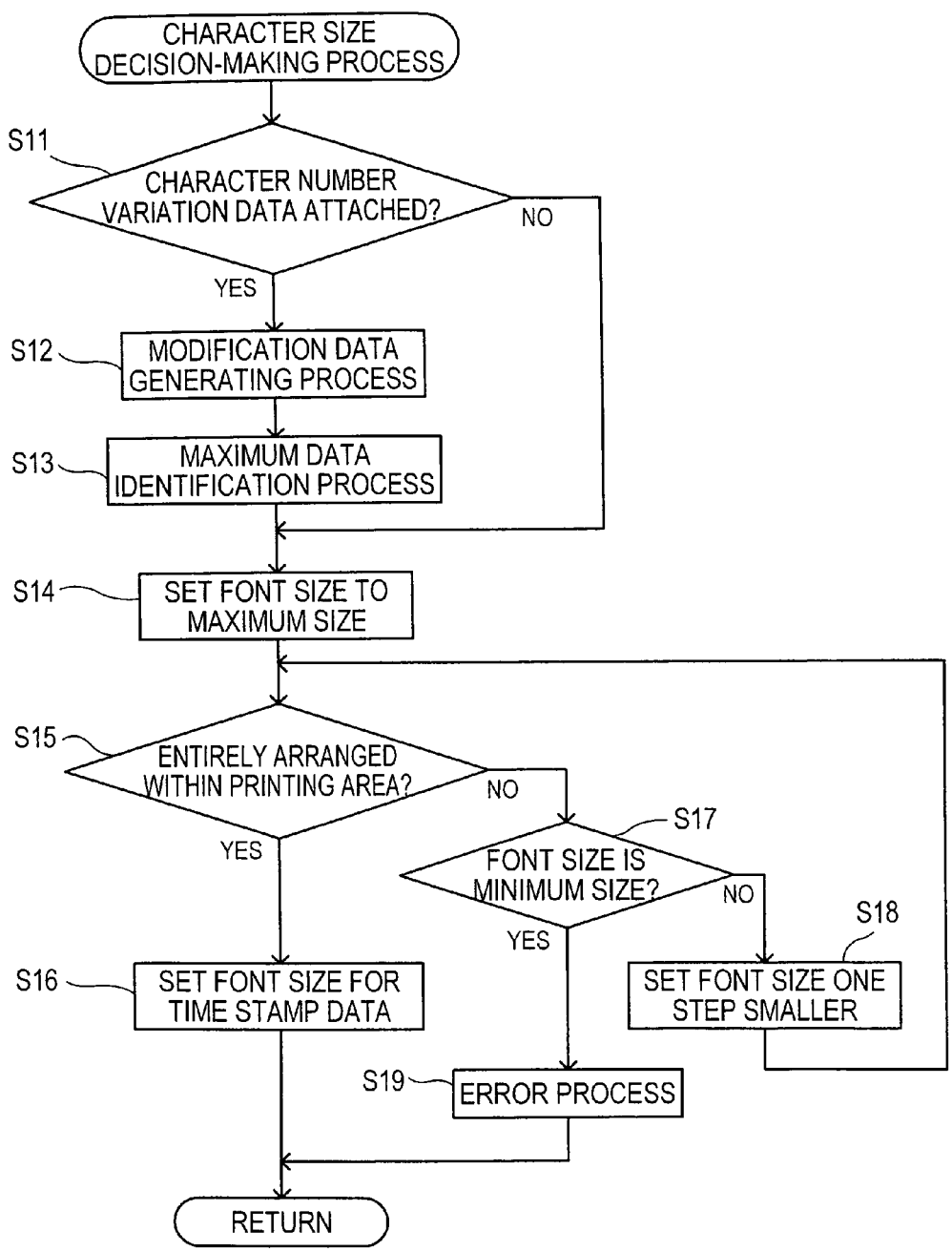
FIG. 10 is a flow chart of a character size decision-making program in the printing apparatus according to the first embodiment.

As shown in FIG. 9, when execution of the main control program is started, the CPU 55 of the print control unit 50 first executes an initialization process of the various types of peripheral devices (S1). This initialization process (S1) includes a process to initialize, etc. the memory contents of the RAM 57. After the initialization process (S1), the CPU 55 moves the process flow to S2.

At S2, the CPU 55 determines whether a print signal was received. Specifically, the CPU 55 determines whether a print signal indicating start printing and the print data was received from the exterior devices through the data communication device 40. If the print signal was received (S2: YES), then the CPU 55 moves the process flow to S3. On the other hand, if no print signal is received (S2: NO), the CPU 55 puts the process in standby until a print signal is received.

At this time, if print data is generated by operating the key input unit 30 and a print signal is received with respect to the above print data, the process flow can be moved to the following process S3 in a similar fashion.

At S3, the CPU 55 determines whether the above print data contains time stamp data. If the print data contains time stamp data (S3: YES), the CPU 55 moves the process flow to S4. On the other hand, if the print data does not contain time stamp data (S3: NO), the CPU 55 moves the process flow to S6.

At S4, the CPU 55 acquires the timed results indicating the present time by referring to the timer 20. The CPU 55 stores the acquired timed results in RAM 57 and moves the process flow to S5.

At S5, the CPU 55 executes a character size decision-making process. The character size decision-making process serves to determine the character size (font size) of the time stamp data. The CPU 55 identifies the character string to be printed as time stamp, based on the expression patterns set for the time stamp data and the timed results of the RAM 57. The CPU 55 then generates modified time stamp data based on the above time stamp data.

Here, the modified time stamp data represents time stamp data which is generated if the time passes, based on the same expression patterns as the above time stamp data. Then, the CPU 55 decides the font size of the above time stamp data based on the time stamp data and the modified time stamp data.

This will be described later with respect to the accompanying drawings.

After the font size of the time stamp data is decided in the character size decision-making process (S5), the CPU 55 moves the process flow to S6.

In S6, the CPU 55 determines whether an error occurs at the time of printing the above print data. More specifically, the CPU 55 makes the determination of S6 based on whether an error process (S19) is executed in the character size decision-making process (S5). If an error occurs (S6: YES), the CPU 55 ends the main control program as is. On the other hand, if no error occurs (S6: NO), the CPU 55 moves the process flow to S7.

In the determining process at S6, a determination may be made with respect to the presence or absence of an error in the print data that does not include time stamp data. In this case, the presence or absence of errors (specifically, whether printing can be performed within the printing area of the printing medium) is preferably determined before the determining process of S6, based on a calculated printing range (the calculating method will be described later) within which the print data is to be printed.

Then, in S7, the CPU 55 executes a printing process. In the printing process (S7), the CPU 55 controls the printing head 60 and the medium feed driving unit 70 through the head driving circuit 61 and the medium feed driving circuit 71. As a result, the CPU 55 carries out printing to the printing medium 5 based on the print data. This printing process (S7) is similar to well known printing process carried out in the printing apparatus 1 and therefore further description thereof is hereby omitted.

When the printing process (S7) is finished, the CPU 55 returns the process flow to S2. As a result, the CPU 55 carries out printing of new print data on condition a print signal is received (S2: YES).

Next, a character size decision-making process program to be executed in S5 of the above main control program will be described while referring to the accompanying drawings.

When the process flow moves to S11, the CPU 55 determines whether expression pattern data in which the number of characters varies is set for the time stamp data included in the print data. More specifically, the CPU 55 determines whether the expression pattern data set with respect to the respective items of the time stamp data has character number variation data attached thereto. If the expression pattern in which the number of characters for the above time stamp data changes is set (S11: YES), the CPU 55 moves the process flow to the modification data generating process (S12). On the other hand, in case of an expression pattern in which the number of characters for the time stamp data does not change (S11:NO), the CPU 55 moves the process flow to S14 as is.

When the process flow moves to S12, the CPU 55 executes the modified data generating process. In this modified data generating process, the CPU 55 first generates time stamp data showing the present time based on the timed results stored in the RAM 57 and the expression pattern data set in the above time stamp data. For instance, in case of the above-described FIG. 3, the CPU 55 generates "2007. February. 04. Sun" as time stamp data showing the present time.

The CPU 55 then generates modified time stamp data based on the time stamp data indicating the present time. This modified time stamp data represents time stamp data which can be generated in accordance with the expression patterns set for the time stamp data within a predetermined period of time having the present time as reference.

To give an explanation based on the example of FIG. 3, the time stamp data which can be generated within a predetermined period of time is generated as modified time stamp data as in "2007. February. 05. Mon", "2007. February. 06. Tue" ... "2007. May. 04. Fri" ... "2007. December. 04. Tue", having the time stamp data showing the present time as in "2007. February. 04. Sun" as reference (refer to FIG. 11).

After the time stamp data showing the present time and the modified time stamp data are stored in the RAM 57, the CPU 55 moves the process flow to S13.

The predetermined period of time in which the modified time stamp data is generated may be a given limited period of time, the length of this time period being irrelevant. Specifically, the time stamp data that can be generated over a period of time of one week starting from the present time may be generated as modified time data. A configuration is also possible in which the time stamp data that can be generated over a period of time of a few years starting from the present time may be generated as modified time stamp data. For instance, if the time period is not particularly set, "year 9999, December 31$^{st}$, 23:59" may be set as the end of the predetermined period. A predetermined date can also be set as the end of the predetermined time period. Further, the above example can also be applied to a printing apparatus which does not include a setting device for setting the predetermined time period.

In S13, the CPU 55 executes a maximum data identification process. This maximum data identification process (S13) helps identify the data with a maximum printing range from amongst the time stamp data indicating the present time and the modified time stamp data. The time stamp data and the modified time stamp data are generated in the modification data generating process (S12).

More specifically, the CPU 55 calculates the printing range for the same font size with respect to the respective time stamp data showing the present time and modified time stamp data. The CPU 55 identifies the data with the maximum printing range (hereinafter referred to as maximum time stamp data) based on the calculated printing range. After identifying the maximum time stamp data, the CPU 55 moves the process flow to S14.

Here, the calculation of the printing range will be described in detail with reference to the accompanying drawings.

Figure 12:
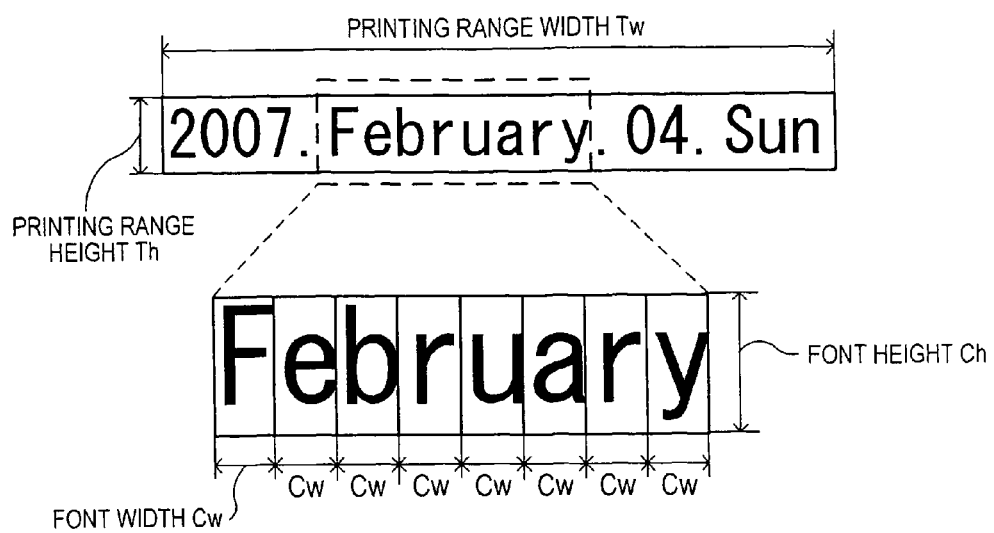
FIG. 12 is an explanatory diagram showing calculation of the printing ranges for the time stamp data.

As shown in FIG. 12, the printing range is calculated using the time stamp data indicating the present time or the modified time stamp data, as object. Here, the time stamp data indicating the present time or the modified time stamp data set as the object for calculating the printing range is referred to as "object time stamp data".

The printing range of the object time stamp data is defined by the printing range width Tw which is the length of the object time stamp data in a width direction thereof, and the printing range height Th which is the length of the object time stamp data in a height direction thereof.

The printing range width Tw is calculated by the aggregate sum of the font width Cw of each character composing the object time stamp data. The font width Cw of the respective characters is read out from the font data stored in the CG-ROM 59 for printing purposes. Accordingly, the CPU 55 reads out the font width Cw corresponding to the respective characters composing the object time stamp data from the CG-ROM 59 for printing purposes and adds them up to thus calculate the printing range width Tw (refer to FIG. 12).

The object time stamp data spreads over a plurality of columns, the maximum font width from the sum of font widths Cw in each column becomes the printing range width Tw.

On the other hand, the printing range height Th is calculated by summing up the font height Ch of each character composing the object time stamp data. The font height Ch for each character is read out from the font data stored in the CG-ROM 59 used for printing purposes, similarly with the font width Cw. Accordingly, the CPU 55 reads out the font height Ch corresponding to each character composing the object time stamp data from the CG-ROM 59 used for printing purposes and adds these up to thus calculate the printing range height Th (refer to FIG. 12).

As described in the above, by calculating the printing range (printing range width Tw and printing range height Th) with respect to the time stamp data indicating the present time and all the modified time stamp data, the maximum time stamp data is identified based on the printing range corresponding to each data.

The modified time stamp data serves to arrange the character strings corresponding to the passage of time based on the expression patterns set with respect to each item. Accordingly, the arrangement state of the characters in the modified time stamp data (for instance, column setting, etc.) does not change from the arrangement state of the characters according to the time stamp data indicating the present time.

Accordingly, as in the example shown in FIG. 11, since the column settings of the character strings composing the time stamp data showing the present time and the modified time stamp data are uniform, the maximum time stamp data can be identified either by the printing range width Tw or the printing range height Th.

When the process flow moves to S14, the CPU 55 first sets the font size for the maximum time stamp data to a maximum size. Then, the CPU 55 calculates the printing range in the case the font size has been set to the maximum size. After saving the printing range for the maximum time stamp data in the RAM 57, the CPU 55 moves the process flow to S15.

In S15, the CPU 55 determines whether the printing range for the maximum time stamp data stored at present in the RAM 57 is arranged inside the printing area set as standard for the printing medium 5. Here, the printing area set as standard for the printing medium 5 can be identified by referring to the type (specifically, size and the like) of the printing medium 5.

If the printing range of the maximum time stamp data is arranged within the printing area (S15: YES), the CPU 55 moves the process flow to S16. On the other hand, if the printing range of the maximum time stamp data is not entirely arranged within the printing area, and protrudes to the outside of the printing area (S15: NO), the CPU 55 moves the process flow to S17.

If the printing range of the maximum time stamp data is not entirely arranged within the printing area, in S17, the CPU 55 determines whether the font size set at present for the maximum time stamp data is the minimum size. If a minimum size is set for the font data stored in the CG-ROM 59 used for printing purposes (S17: YES), the CPU 55 moves the process flow to an error process (S19). On the other hand, if a font data of a font size other than a minimum size is set (S17: NO), the CPU 55 moves the process flow to S18.

When the process flow moves to S18, the CPU 55 sets the font size which is set at present for the maximum time stamp data to a one step smaller size. Specifically, the CPU 55 sets the font data for a font size which is one step smaller than the font size set at present to maximum time stamp data. At this time, the CPU 55 calculates the printing range for the maximum time stamp data based on the font size which was newly set and then stores the result in the RAM 57. After this, the CPU 55 returns the process flow to S15.

Accordingly, if the process flow is moved from S18 to S15, at S15, a determination is made on whether the printing range of the maximum time stamp data is arranged within the printing area, based on the printing range calculated in accordance with the one step smaller font size.

On the other hand, if the process flow moves to the error process (S19), the CPU 55 reports an error to the user. This occurs because the time stamp data cannot be printed within the printing area even if the font size is set to a minimum size. More specifically, the CPU 55 controls a display state of the liquid crystal display 10 through the display driving circuit 11 and reports to the user that an error has occurred. The user can thus acknowledge that the time stamp data cannot be printed.

After the liquid crystal display 10 has displayed an error, the CPU 55 ends the character size decision-making process program and moves the process flow to the S6 of the main control program.

In this case, since an error occurs (S6: YES), the printing process (S7) is not executed. Accordingly, the user can acknowledge an error before the time stamp data is printed onto the printing medium 5, thereby allowing correction of the time stamp data (for instance, changing the expression pattern for the respective items, such as "year", etc.).

If the printing range of the maximum time stamp data is entirely arranged within the printing area (S15: YES), in S16, the CPU 55 sets the font size which is set at present for the maximum time stamp data as the font size for the time stamp data indicating the present time and the modified time stamp data. Then, after the font size for the time stamp data is set, the CPU 55 ends the character size decision-making process program and moves the process flow to S6 of the main control program.

Depending on the font size set at S16, the printing range of the maximum time stamp data is entirely arranged within the printing area. Accordingly, the printing range of the maximum time stamp data as well as of other types of time stamp data can be entirely arranged in the printing area.

Here, an example in which the time stamp data is printed onto the printed medium 5 in accordance with the font size set in S16 will now be described based on FIG. 13.

The views at the upper side, middle side and lower side of FIG. 13 show the printing medium 5 onto which time stamp data indicating the respectively different times has been printed. As shown in the views at the upper side, middle side and lower side of FIG. 13, the number of characters constituting the respective time stamp data differs. Since the time stamp data shown at an upper side, middle side and lower side of FIG. 13 is printed in a font size set in the above-described process S16, there is no difference in the font size for any of the printed time stamp data. In S16, since the maximum time stamp data is set to a font size which can be printed within the printing area, the time stamp data at the upper side, middle side and lower side of FIG. 13 is reliably printed within the printing area of the printing medium 5.

Specifically, by printing using this font size, both the time stamp data indicating the present time and the modified time stamp data are printed within the printing area of the printing medium 5. Accordingly, even if time passes, printed time stamp data never protrudes out of the printing area thereby avoiding a situation in which the print data is printed only partial (refer to FIG. 13). Since the time stamp data is printed using a font size set in S16, the font size of the time stamp data does not vary with the passage of time. Specifically, since the time stamp data is printed using a uniform font size, the sense of beauty of the printed time stamp data is not spoiled, even with the passage of time.

As was described in the above, the printing apparatus 1 according to the first embodiment generates modified time stamp data (S12) based on the expression pattern set for the time stamp data, in the character size decision-making process (S5). The printing apparatus 1 identifies the maximum time stamp data with the largest printing range from amongst the time stamp data and the modified time stamp data (S13).

Thereafter, the printing apparatus 1 sets the largest font size which can be printed within the printing area of the printing medium 5 as the font size of the time stamp data and the modified time stamp data while using the printing range of the maximum time stamp data as reference (S16).

As a result, in case of printing time stamp data whose printing range greatly varies with the passage of time, the font size for the time stamp data is printable within the printing area of the printing medium 5 and is made uniform to the largest font size. Accordingly, the printing apparatus 1 can prevent inconsistencies in the font size and protrusion of the printed product from the printing area, thereby making it possible to provide to the user an attractive printed product having a sense of unity.

In the printing apparatus 1, the expression patterns in which the number of character varies in accordance with the passage of time have character number variation data attached thereto. If the expression pattern set for the time stamp data has character number variation data attached thereto, the CPU 55 executes a modification data generating process (S12) and a maximum data identification process (S13), thereby automatically setting the font size (S14 to S18). Specifically, automatic setting of the font size can be easily carried out with respect to the time stamp data which does not have character number variation data attached thereto (S14 to S18). As a result, the modification data generating process (S12) and the maximum data identification process (S13) are executed only when they become necessary, whereby the processing burden on the CPU 55 can be reduced.

Further, if the printing range of the maximum time stamp data for the date print data protrudes out of the printing area (S15: NO) and the font size of the maximum time stamp data is set to the minimum size (S17: YES), the printing apparatus 1 executes an error process (S19). In this error process (S19), since an error is displayed on the liquid crystal display unit 10, the user can acknowledge that the printed product will surely protrude out from the printing area when the time stamp data is to be printed in the printing area. As a result, the user can confirm that the printed product will have a bad appearance without any printing medium 5 being wasted. Thus, the printing apparatus 1 prompts the user to suitably modify the printing data.

Second Embodiment

Here, a second embodiment of a printing apparatus according to the disclosure, which is different from the printing apparatus of the first embodiment, will now be described in detail while referring to the accompanying drawings. In the second embodiment, elements which are the same as those described in the first embodiment will be denoted by the same symbols.

The printing apparatus 1 according to the second embodiment basically has the same configuration as the printing apparatus according to the first embodiment. The main control program of the printing apparatus according to the second embodiment as well has the same configuration as the main control program according to the first embodiment. Accordingly, a detailed description of the same configuration as that of the first embodiment will hereby be omitted.

Similarly with the first embodiment, the printing apparatus 1 according to the second embodiment has a ROM 56. In the second embodiment as well, the ROM 56 has an expression pattern data memory area 56A formed therein.

In the second embodiment, the memory contents including "year expression pattern data", "month expression pattern data", "day expression pattern data", "day-of-the-week expression pattern data" and "time expression pattern data" stored in the expression pattern data memory area 56A differ.

More specifically, in the above-described first embodiment, each of the expression patterns constituting the respective expression pattern data such as "year expression pattern data" and the like has character number variation data attached thereto as needed. In the second embodiment, however, neither of the expression patterns in the expression pattern data memory area 56A has character number variation data attached thereto. As a result, the memory size required by the expression pattern data memory area 56A can be reduced.

The memory contents of the expression pattern data memory area 56A according to the second embodiment are the same as the memory contents of the expression pattern data memory area 56A according to the first embodiment, except for the feature that "no character number variation data is attached". Specifically, since the respective expression patterns have already been described in detail based on FIG. 4 through FIG. 8, further description thereof is hereby omitted.

Next, the control in the printing apparatus 1 according to the second embodiment will be described in detail while referring to the drawings. Here, as described in the above, the printing apparatus 1 according to the second embodiment is controlled by the same control program as the main control program according to the above-described first embodiment. Accordingly, description of the main control program will hereby be omitted.

However, in the second embodiment, the character size decision-making program executed in the character size decision-making process (S5) of the main control program differs from that of the first embodiment. Accordingly, in the printing apparatus 1 according to the second embodiment, the character size decision-making process program executed in the S5 of the main control program will be described in detail while referring to the drawings.

Figure 14:
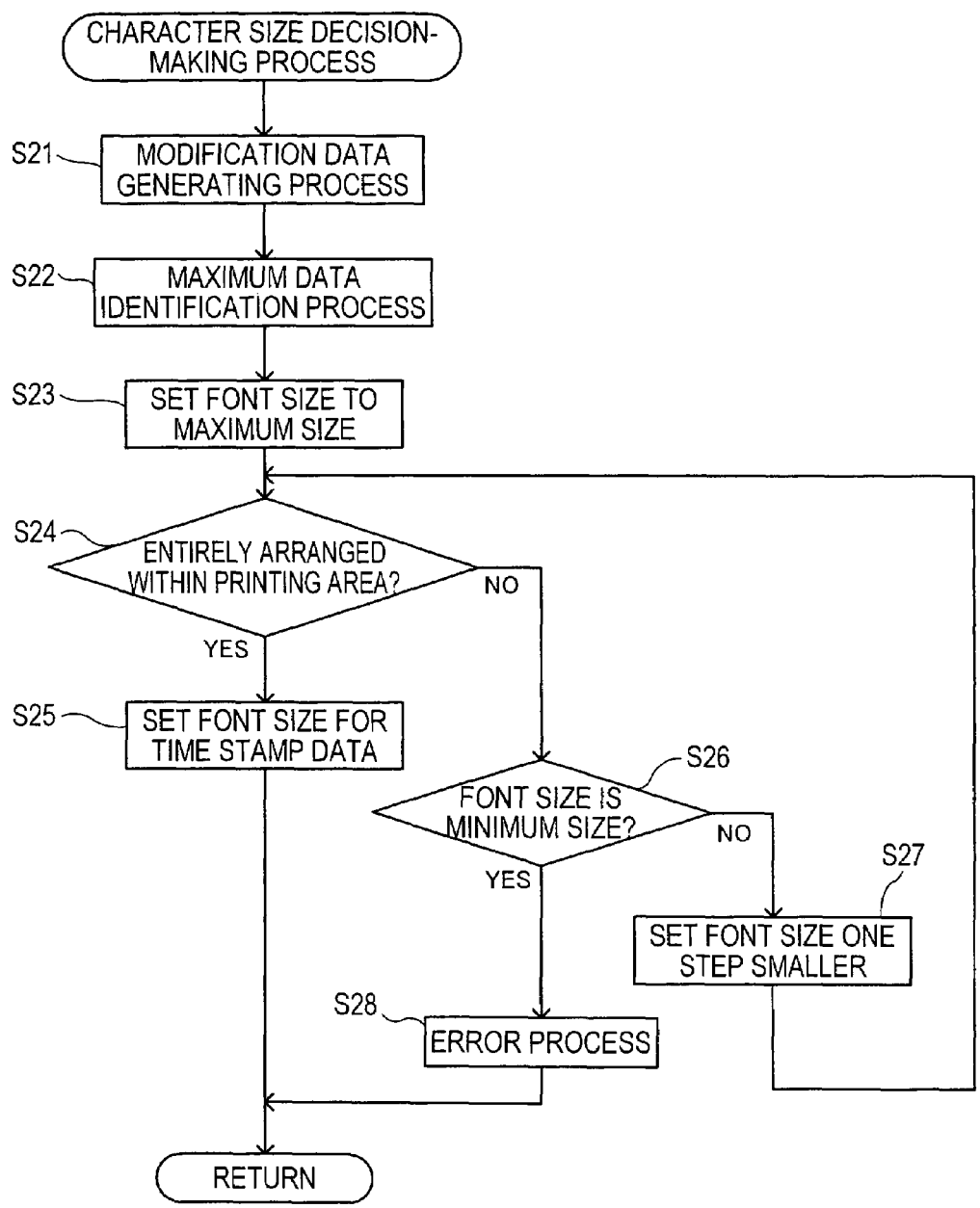
FIG. 14 is a flow chart of a character size decision-making program in a printing apparatus according to a second embodiment.

As shown in FIG. 14, when the process flow moves to the character size decision-making process (S5) in the second embodiment, the CPU 55 executes a modification data generating process (S21).

As was described in the above, in the second embodiment, the respective expression patterns do not have character number variation data attached thereto. Accordingly, in the second embodiment, the CPU 55 executes the modification data generating process (S21) without carrying out a process corresponding to the determining process in S11 according to the first embodiment.

Specifically, since the CPU 55 reliably executes the modification data generating process (S21) in the second embodiment, modified time stamp data is reliably generated for the time stamp data, irrespective of the type of expression pattern which is set for this time stamp data. After generating the modified time stamp data, the CPU 55 moves the process flow to S22.

Since the process contents in the data generating process (S21) are the same as those in the first embodiment, a detailed description thereof is hereby omitted.

In S22, the CPU 55 executes a maximum data identification process (S22). The maximum data identification process (S22) serves to identify the data with a maximum printing range from amongst the time stamp data indicating the present time and the modified time stamp data generated in the modification data generating process (S21).

Accordingly, in the maximum data identification process (S22) in the second embodiment, the CPU 55 identifies the maximum time stamp data from amongst the time stamp data and the modified time stamp data irrespective of the type of expression patterns that have been set for the time stamp data showing the present time. After identifying the maximum time stamp data, the CPU 55 moves the process flow to S13.

Since the process relating to identifying the maximum time stamp data in this maximum data identification process (S22) is the same as the maximum data identification process (S13) in the first embodiment, a detailed explanation thereof will hereby be omitted.

Then, in the printing apparatus 1 according to the second embodiment, the CPU 55 executes the processes from S23 to S28. The processes from S23 to S28 are the same as the processes from S14 to S19 in the first embodiment. The processes from S14 to S19 have been described in detail in the first embodiment, and therefore, a detailed description of their equivalent processes S23 to S28 will hereby be omitted.

Thus, in the printing apparatus 1 according to the second embodiment, the modification data generating process (S21) and the maximum data identification process (S22) are carried out irrespective of the settings (specifically, font and expression pattern) for the time stamp data indicating the present time. The CPU 55 then sets the font size at which the maximum time stamp data is printable within the printing area as the font size for the time stamp data showing the present time and the modified time stamp data.

As a result, according to the printing apparatus of the second embodiment, in case of printing time stamp data whose printing range varies greatly with the passage of time, the font size for the time stamp data is printable within the printing area of the printing medium 5 and is made uniform to the maximum font size. Thus, according to printing apparatus 1, inconsistencies in the font size as well as protrusion of the printed product from the printing area can be prevented, thereby making it possible to provide to the user an attractive printed product having a sense of uniformity.

Further, according to the printing apparatus 1 of the second embodiment, the modification data generating process (S21) and the maximum data identifying process (S22) are executed irrespective of the settings (font type, expression pattern) for the time stamp data. Thus, the printing apparatus 1 according to the second embodiment can be employed even if the font set for the time stamp data is a "fixed-width font", or a "proportional font".

Further, the printing apparatus 1 according to the second embodiment executes an error process (S28) in the case that the printing range of the maximum time stamp data protrudes out from the printing area (S24: NO) and the font size of the maximum time stamp data is set to a minimum size (S26: YES). In this error process (S28), an error is displayed on the liquid crystal display unit 10, thereby enabling the user to acknowledge that the printed product will surely protrude out from the printing area when the time stamp data is to be printed in the printing area. As a result, it is possible to confirm that the printed product will have a bad appearance without any printing medium 5 being wasted, and the user can be prompted to correct the print data as appropriately.

The present disclosure may be embodied in other specific forms without departing from the spirit or essential characteristics thereof. For instance, the time stamp data which can be used in the printing apparatus 1 according to the present embodiment may also include pattern data having "seconds". The time stamp data may also include pattern data which does not have "year".

Upon identifying the maximum time stamp data, modified data is generated for each item including "year" "month" "day" "day of the week" "hour" "minutes", and the "maximum modified data" for each of these items is identified. Then, the printing ranges of the "maximum modified data" for each of the above items are added together, which makes it possible to identify the maximum time stamp data.

While the presently preferred embodiment of the present disclosure has been shown and described, it is to be understood that this disclosure is for the purpose of illustration and that various changes and modifications may be made without departing from the scope of the disclosure as set forth in the appended claims.

What is claimed is:

1. A printing apparatus comprising:
a timing device that times passage of time;
a memory device that stores a plurality of time expression patterns that are each formats for indicating a plurality of different times, wherein at least one of the plurality of time expression patterns indicates at least two distinct times of the plurality of different times with different numbers of characters;
an expression pattern setting device that selects a current expression pattern from the plurality of time expression patterns stored in the memory device;
a print-signal-receipt-date obtaining device that obtains a timed result from the timing device with respect to a receipt date of a print signal upon receipt of the print signal;
a first date print data generating device that generates first date print data based on the current time expression pattern set by the expression pattern setting device and the timed result obtained by the print-signal-receipt-date obtaining device;
a second date print data generating device that generates a plurality of second date print data, the second date print data representing times spaced at predetermined intervals within a predetermined period of time that starts from the timed result, each of the second date print data based on the current time expression pattern set in the expression pattern setting device;
a maximum printing range identifying device that calculates printing ranges for a character size for the first date print data and for each of the plurality of second date print data and identifies a largest print image from among the first date print data and plurality of second date print data, the largest print image having a maximum printing range from the printing ranges thus calculated:
a size setting device that sets a printing character size by iteratively reducing the character size of the largest print data until the printing range of the largest print image fits within a predetermined printing area of a single fixed size provided on each printing medium onto which a date is to be printed, and then sets the character size as the printing character size for characters comprising the first date print data and the plurality of second date print data;
a controller; and
a printing device, wherein the controller controls the printing device to print the first date print data and each of the plurality of second date print data onto the predetermined printing area of respective pieces of print medium with the current time expression pattern and the printing character size.

2. The printing apparatus according to claim 1, wherein the memory device storage device stores the date expression pattern with number-of-characters data so as to indicate the number of characters for indicating time directed to the date expression changes with passage of time.

3. The printing apparatus according to claim 1, further comprising:
a determining device that determines whether a part of the largest print image is arranged outside of the printing area when the character size of the first date print data and the plurality of second date print data is set to a minimum size by the size setting device; and
an error reporting device that reports an error regarding printing the first date print data and the plurality of second date print data when the determining device determines that the printing range for the largest print image is arranged outside of the printing area.

4. A printing apparatus comprising:
a timing device that times passage of time;
a memory device that stores a plurality of time expression patterns that are each formats for indicating a plurality of different times, wherein at least one of the plurality of time expression patterns indicates at least two distinct times of the plurality of different times with different numbers of characters;
a printing device; and a controller that executes:
an expression pattern setting step that selects a current expression pattern from the plurality of time expression patterns stored in the memory device;
a print-signal-receipt-date obtaining step that obtains a timed result from the timing device with respect to a receipt date of a print signal upon receipt of the print signal;
a first date print data generating step that generates first date print data based on the current time expression pattern set at the expression pattern setting step and the timed result obtained at the print-signal-receipt-date obtaining step;
a second date print data generating step that generates a plurality of second date print data, the second date print data representing times spaced at predetermined intervals within a predetermined period of time that starts from the timed result, each of the second date print data based on the current time expression pattern set at the expression pattern setting step;
a maximum printing range identifying step that calculates printing ranges for a character size for the first date print data and for each of the plurality of second date print data and identifies a largest print image from among the first date print data and plurality of second date print data, the largest print image having a maximum printing range from the printing ranges thus calculated;
a size setting step that sets a printing character size by iteratively reducing the character size of the largest print data until the printing range of the largest print image fits within a predetermined printing area of a single fixed size provided on each printing medium onto which a date is to be printed, and then sets the character size as the printing character size for characters comprising the first date print data and the plurality of second date print data; and
a printing step, wherein the controller controls the printing device to print the first date print data and each of the plurality of second date print data onto the predetermined printing area of respective pieces of print medium with the current time expression pattern and the printing character size.

5. The printing apparatus according to claim 4, wherein the memory device storage device stores the date expression pattern with number-of-characters data so as to indicate the number of characters for indicating time directed to the date expression changes with passage of time.

6. The printing apparatus according to claim 4, wherein the controller executes:
a determining step that determines whether a part of the largest print image is arranged outside of the printing area when the character size of the first date print data and the plurality of second date print data is set to a minimum size by the size setting step; and
an error reporting step that reports an error regarding printing the first date print data and the plurality of second date print data when the determining device determines that the printing range for the largest print image is arranged outside of the printing area.

7. A non-transitory tangible computer-executable medium having instructions stored thereon that, when executed by a processor, perform a method comprising:
an expression pattern setting step that selects a current time expression from a plurality of time expression patterns in a memory device, wherein at least one of the plurality of time expression patterns expression patterns indicates at least two distinct times with different numbers of characters;
a print-signal-receipt-date obtaining step that obtains a timed result from a timing device that times passage of time, wherein the timed result relates to a receipt date of a print signal upon receipt of the print signal;
a first date print data generating step that generates first date print data based on the current time expression pattern set at the expression pattern setting step and the timed result obtained at the print-signal-receipt-date obtaining step;
a second date print data generating step that generates a plurality of second date print data, the second date print data representing times spaced at predetermined intervals within a predetermined period of time that starts from the timed result, each of the second date print data based on the current time expression pattern set at the expression pattern setting step;
a maximum printing range identifying step that calculates printing ranges for a character size for the first date print data and for each of the plurality of second date print data and identifies a largest print image from among the first date print data and the plurality of second date print data, the largest print image having a maximum printing range from the printing ranges thus calculated;
a size setting step that sets a printing character size by iteratively reducing the character size of the largest print data until the printing range of the largest print image fits within a predetermined printing area of a single fixed size provided on each printing medium onto which a date is to be printed, and then sets the character size as the printing character size for characters comprising the first date print data and the plurality of second date print data; and
a printing step, wherein the processor controls a printing device to print the first date print data and each of the plurality of second date print data onto the predetermined printing area of respective pieces of print medium with the current time expression pattern and the printing character size.

8. The non-transitory tangible computer-executable medium according to claim 7, wherein:
the memory device storage device stores the date expression pattern with number-of-characters data so as to indicate the number of characters for indicating time directed to the date expression changes with passage of time; and the method further comprises:
the step of accessing the number-of-characters data.

9. The non-transitory tangible computer-executable medium according to claim 7, wherein the method further comprises:
a determining step that determines whether a part of the largest print image is arranged outside of the printing area when the character size of the first date print data and the plurality of second date print data is set to a minimum size by the size setting step; and
an error reporting step that reports an error regarding printing the first date print data and the plurality of second date print data when the determining device determines that the printing range for the largest print image is arranged outside of the printing area.

* * * * *